INVENTOR.
SENO SPARER

3,151,205
VIEWING INSTRUMENTS WITH ROTATABLY
ADJUSTABLE OPTICAL ELEMENTS
Seno Sparer, Mahopac, N.Y., assignor to The Ednalite
Corporation, a corporation of New York
Filed June 1, 1961, Ser. No. 114,206
5 Claims. (Cl. 88—65)

This invention relates to instruments or the like and has particular reference to a new and improved arrangement for such instruments whereby a member which is completely contained in the optical tube or barrel is controlled by controls accessible externally of the tube.

An object of the invention is to provide a new and improved arrangement of the type set forth for optical instruments or the like, which arrangement is relatively simple and inexpensive, yet efficient.

Another object is to provide a device of the type set forth which is completely contained in a single unit in the instrument barrel but which has controls accessible on the exterior of the instrument.

Another object is to provide a new and improved arrangement of the type set forth which allows the member to be positioned in or out of operative position easily and quickly.

Another object is to provide a light filter arrangement for optical instruments or the like which is relatively simple and inexpensive and which is positioned completely within the instrument barrel but with exterior control means and which allows a member to be easily and quickly positioned in and out of operative position and also allows the rotary adjustment of the member.

Other objects and advantages of the invention will be apparent from the following description taken in connection with the accompanying drawing in which the preferred form of the invention has been given by way of illustration only.

While the invention has been shown for the purpose of illustration only as applied to light filters, it is pointed out that instead of such light filters the invention could be applied for use with such devices as photocells, filters, lenses and lens elements, singly or in combination, prisms, mirrors or reflectors, screens, reticules or other members and could be employed for interposing one or more such members and for rotating any such member as might be desired.

Referring to the drawings.

Figure 1:
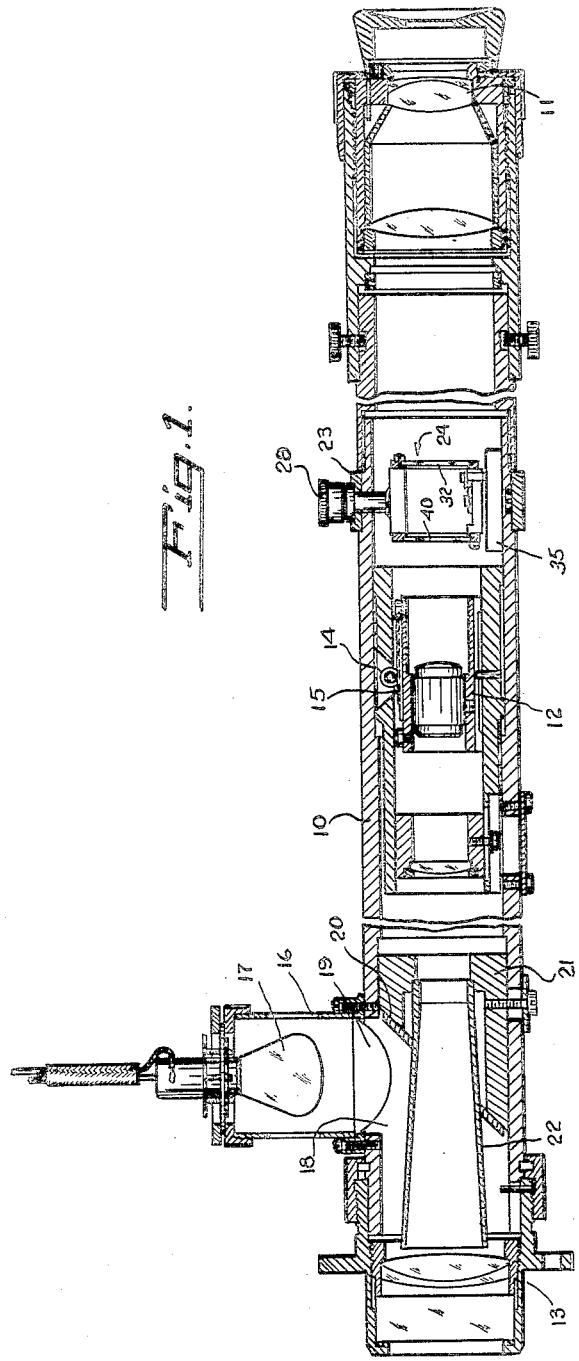
FIGURE 1 is a longitudinal sectional view of a representative form of optical viewing instrument embodying the invention.

Referring more particularly to the drawings wherein similar reference characters designate corresponding parts throughout, the invention has been shown applied to an optical viewing instrument only for the purpose of illustrating its use in one form of instrument. It will be understood that the invention may be applied to any form of instrument or optical instrument wherein it is desired to position a member or unit in the tube of the instrument with the member easily and quickly adjustable into and out of the line of operative position by controls accessible exteriorly of the tube.

The optical viewing instrument shown embodying the invention comprises a sight tube or body 10 having the eye piece 11 focusing erectors 12 and objective 13.

The erectors 12 are adjustable in the usual manner through the gear 14 and rack 15, which gear is operated by the usual knob externally of the sight tube and which knob is not shown.

In the form of instrument shown there is embodied a light casing 16 containing a lamp 17 and which casing 16 is secured to the tube 10 on one side thereof and in optical alignment with a light passage 18 in said tube 10 and the condensing lens 19 is provided in optical alignment with lamp 17 and with inclined reflector 20 which is positioned on annular support 21 to which is secured the light baffle 22 whereby light is reflected by reflector 20 from lamp 17 through objective 13 onto the object to be viewed while the viewer is viewing the object through the optical system and light baffle 22 which prevents interference of light with the viewer.

The light filter arrangement shown for the purpose of illustrating the invention comprises an arcuate slot 25 in tube 10 and a ring 23 surrounding tube 10 over slot 25 and adjacent the light filter arrangement within tube 10 and which arrangement is designated generally at 24. The length of slot 25 depends on the degree of pivotal adjustment desired.

If the light filter arrangement 24 does not embody light polarizing elements or other devices to be rotated, then the slot 25 and ring 23 are not necessary but where light polarizing elements or other devices to be pivoted are employed then the slot 25 and ring 23 are necessary and for use with light polarizing filters slot should extend for at least 90 degrees in order to allow adjustment of the light polarizing filter to vary the density of light.

In the form of arrangement shown, the shaft 26 is positioned in a bearing or support 27 which is secured in position by screw or the like 34 and on the end of shaft 26 external of sight tube 10 is provided the knob 28 which is adapted to be secured to shaft 26 by set screw 29 or other suitable means.

On the end of shaft 26 within tube 10 is positioned a support 30 which is preferably normal to but could be lateral of the axis of shaft 26 and the ring 31 containing light filter 32 is secured to support 30 by means of screw 33 or other suitable means.

Between the adjacent surfaces of knob 28 and bearing 27 is provided a detent or other suitable stop means 42 to retain the knob and shaft and thereby retain the filter 32 in adjusted position.

On the inner surface of tube 10 preferably substantially diametrically opposite shaft 26 is positioned the supporting block 35 by means of screw 36 or other suitable means and on said block 35 is pivotally mounted a support 37 by means of pivot 38.

For the use illustrated the supports 30 and 37 are substantially of the same size and outline and on the side of support 37 opposite filter 32 is secured ring 39 containing filter 40. Ring 39 is secured to support 37 by means of screws 41 or other suitable means.

On support 37 is secured one end of two position spring 42 which has its opposite end connected to screw 43 on tube 10 and spring 42 is adapted to retain support 37 in operative position as shown or in a position normal to that shown at which time the light filter or other member is out of operative position.

Figure 2:
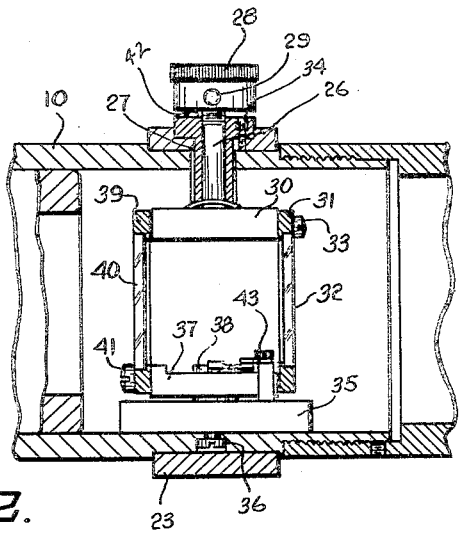
FIGURE 2 is a fragmentary view similar to FIGURE 1 but on an enlarged scale.
Figure 3:
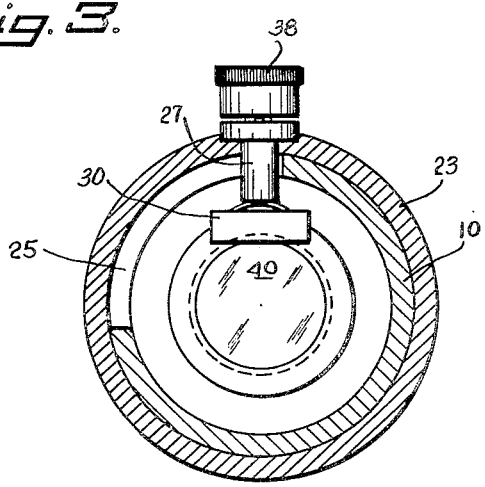
FIGURE 3 is a sectional view taken on line 3—3 of FIGURE 1 looking in the direction of the arrows.
Figure 4:
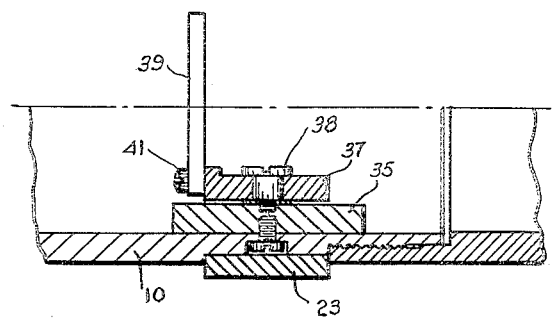
FIGURE 4 is a side view of a portion of the filter arrangement.
Figure 5:
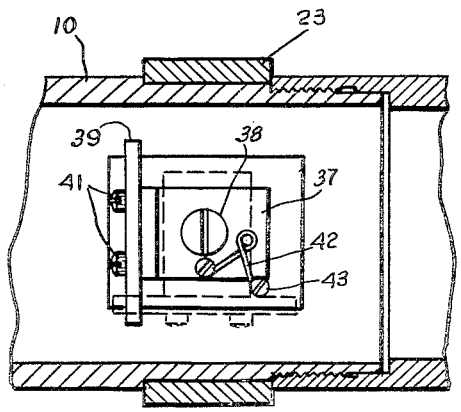
FIGURE 5 is a top or plan view of the arrangement shown in FIGURE 4.

As is apparent on FIG. 5, support 37, and hence also support 30, are of rectangular outline. Further, as shown particularly on FIGS. 1 and 2, the ring or frame 31 carrying the filter 32 is secured to the side of rectangular support 30 that is opposite the side of support 37 to which ring or frame 39 of filter 40 is secured. It will also be seen that the rings 31 and 39 are diametrically dimensioned so as to extend into sliding engagement with the sides of supports 37 and 30, respectively, opposed to those sides of the supports at which the rings are secured, thereby always maintaining the filters 32 and 40 in parallel planes. Thus, when shaft 26 is angularly adjusted in slot 25 so as to be in axial alignment with pivot 38 of support 37, rotation of shaft 26 by its knob 28, causing turning of support 30 and of ring 31 and filter 32 about the axis of shaft 26, is transmitted, through the described engagement of rings 31, and 39 with supports 37 and 30, to the support 37. Accordingly, rotation of shaft 26 about its axis causes simultaneous turning of filters 32 and 40 about the axes of shaft 26 and pivot 38 which extend diametrically with respect to the axis of tube or body 10.

It is pointed out that, where only the single light filter or other member 32 is employed, it is not necessary to provide the supports 35, 37 and filter 40 but that by turning of knob 28, shaft 26 and support 30 are turned thereby positioning filter or other member 32 in or out of the line of sight or other operative position as desired and where the multiple system is employed, adjustment of member 32 into or out of the line of sight by rotation of shaft 26 automatically effects similar adjustment of member 40 by adjusting support 37 to which member 40 is fixed.

It will also be seen that, where the filters employed are of the light polarizing type or other members that require relative angular movement of one filter relative to the other about the optical axis, that is, the central axis perpendicular to the parallel planes of the filters, turning of the ring 23 about tube 10 will automatically effect angular movement of shaft 26 in slot 25 and support 30 thus varying the angular relationship between member 32 and member 40 to vary the density of the light polarizing filter or other relative rotative adjustment of the members.

The operation of the device is believed apparent from the foregoing description.

From the foregoing it will be seen that I have provided new and improved means for obtaining all of the objects and advantages of the invention.

I claim:

1. An optical viewing instrument comprising a tube having an optical axis extending axially therein, said tube further having a slot extending in the circumferential direction in the wall of the tube, a shaft extending through said slot and having its axis maintained radially with respect to the axis of said tube, means mounting said shaft for rotation about is axis and for movement along said slot during which the axis of said shaft turns around the axis of said tube, a first support secured to the inner end of said shaft for rotation with the latter about said axis of the shaft and for turning with the shaft about said axis of the tube, a first optical element in said tube, means mounting said first optical element on said first support so as to be offset from said axis of the shaft, a second support in said tube, means mounting said second support for rotation about an axis extending radially with respect to said axis of the tube and lying in the same plane as said axis of the shaft, a second optical element in said tube, means mounting said second optical element on said second support so as to be offset from the axis of rotation of the latter, at least one of said mounting means for the first and second optical elements engaging the support for the other optical element to maintain said optical elements in face-to-face, spaced apart relation; whereby turning of said shaft about the axis of the tube causes turning of said first optical element relative to said second optical element also about said axis of the tube, and rotation of said shaft about its axis when the latter is aligned with said axis of rotation of the second support causes joint turning of said first and second optical elements about the aligned axes of the shaft and second support which extend diametrically relative to said axis of the tube for moving said optical elements between operative positions across said optical axis and in operative positions at opposite sides of the optical axis.

2. An optical viewing instrument as in claim 1; wherein said first and second optical elements are light polarizing filters so that said turning of the first optical element relative to said second optical element about said axis of the tube varies the effective density of the light polarizing filters when the latter are in said operative positions.

3. An optical viewing instrument as in claim 1; wherein the mounting means for the first and second optical elements are rings lying in parallel spaced apart planes, and said first and second supports have straight sides parallel to said rings mounting the first and second optical elements, respectively, the straight side of said first support being slidably engaged by the mounting ring of said second optical element and the straight side of said second support being slidably engaged by the mounting ring of said first optical element.

4. An optical viewing instrument as in claim 1; wherein said means mounting the shaft includes a ring extending slidably around said tube and covering said slot of the latter, and a bearing carried by said ring and having said shaft rotatable therein.

5. An optical viewing instrument as in claim 1; further comprising means releasably holding said optical elements in said operative and inoperative positions.

References Cited in the file of this patent

UNITED STATES PATENTS

| | | |
|---|---|---|
| 735,460 | Burnham | Aug. 4, 1903 |
| 1,873,356 | Stimson et al. | Aug. 23, 1932 |
| 2,399,658 | Banker | May 7, 1946 |
| 2,494,543 | Clarke | Jan. 17, 1950 |
| 2,986,068 | Mandaville | May 30, 1961 |

FOREIGN PATENTS

| | | |
|---|---|---|
| 170,238 | Germany | Apr. 26, 1906 |
| 1,189 | Great Britain | of 1915 |
| 822,403 | France | Sept. 20, 1937 |
| 483,563 | Canada | May 27, 1952 |